US009513951B2

(12) United States Patent
Arges et al.

(10) Patent No.: US 9,513,951 B2
(45) Date of Patent: *Dec. 6, 2016

(54) MAINTAINING HARDWARE RESOURCE BANDWIDTH QUALITY-OF-SERVICE VIA HARDWARE COUNTER

(71) Applicant: International Business Machines Corporation, Armonk, NY (US)

(72) Inventors: Christopher J. Arges, Austin, TX (US); Nathan D. Fontenot, Georgetown, TX (US); Jeffrey D. George, Austin, TX (US); Joel H. Schopp, Austin, TX (US); Michael T. Strosaker, Austin, TX (US); Mark VanderWiele, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/883,205

(22) Filed: Oct. 14, 2015

(65) Prior Publication Data
US 2016/0034299 A1     Feb. 4, 2016

Related U.S. Application Data

(63) Continuation of application No. 13/539,318, filed on Jun. 30, 2012, now Pat. No. 9,183,054.

(51) Int. Cl.
| G06F 9/46 | (2006.01) |
| G06F 9/455 | (2006.01) |
| G06F 9/50 | (2006.01) |
| G06F 9/48 | (2006.01) |

(52) U.S. Cl.
CPC ......... *G06F 9/45558* (2013.01); *G06F 9/4837* (2013.01); *G06F 9/5011* (2013.01);
(Continued)

(58) Field of Classification Search
None
See application file for complete search history.

(56) References Cited

U.S. PATENT DOCUMENTS 5,771,358 A * 6/1998 LaBerge .............. G06F 13/4217
                                                          710/107
6,996,838 B2 * 2/2006 Rodriguez .............. H04N 19/61
                                                          370/474
(Continued)

FOREIGN PATENT DOCUMENTS

| CN | 101044458 | 9/2007 |
| CN | 101620551 | 1/2010 |

OTHER PUBLICATIONS

Non-final office action for U.S. Appl. No. 13/539,318 dated Jan. 16, 2015, 31 pp.
(Continued)

*Primary Examiner* — Wissam Rashid
(74) *Attorney, Agent, or Firm* — Steven Bennett

(57) ABSTRACT

Each time a currently scheduled virtual machine (VM) accesses a hardware resource over a bus for the hardware resource via the currently scheduled VM running on a processor, a hardware component adjusts a bandwidth counter associated with usage of the bus for the hardware resource, without involvement of the currently scheduled VM or a hypervisor managing the currently scheduled VM. Responsive to the bandwidth counter reaching a threshold value, the hardware component issues an interrupt for handling by the hypervisor to maintain bandwidth quality-of-service (QoS) of bus bandwidth related to the hardware resource. Upon expiration of a regular time interval prior to the bandwidth counter reaching the threshold value, the hardware component resets the bandwidth counter to a predetermined value associated with the currently scheduled VM, without involvement of the currently scheduled VM or the hypervisor; the hardware component does not issue an interrupt. The hardware resource can be memory.

15 Claims, 4 Drawing Sheets

(52) U.S. Cl.
CPC .......... *G06F 9/5016* (2013.01); *G06F 9/5077* (2013.01); *G06F 2009/45579* (2013.01); *G06F 2209/504* (2013.01); *Y02B 60/142* (2013.01)

(56) References Cited

U.S. PATENT DOCUMENTS

| | | | |
|---|---|---|---|
| 7,979,857 B2 | 7/2011 | Esfahany et al. | |
| 8,826,270 B1* | 9/2014 | Lewis | G06F 9/45558 718/1 |
| 9,183,022 B2 | 11/2015 | Arges et al. | |
| 9,183,054 B2 | 11/2015 | Arges et al. | |
| 2004/0168005 A1* | 8/2004 | Civlin | G06F 11/3409 710/260 |
| 2005/0138621 A1* | 6/2005 | Clark | G06F 9/52 718/100 |
| 2010/0241785 A1 | 9/2010 | Chen et al. | |
| 2011/0004875 A1* | 1/2011 | Elnozahy | G06F 9/455 718/1 |
| 2011/0138147 A1 | 6/2011 | Knowles et al. | |
| 2014/0007091 A1 | 1/2014 | Arges et al. | |
| 2014/0007096 A1 | 1/2014 | Arges et al. | |

OTHER PUBLICATIONS

Notice of allowance for U.S. Appl. No. 13/539,318 dated Jul. 6, 2015, 14 pp.
Non-final office action for U.S. Appl. No. 13/780,204 dated Mar. 12, 2015, 33 pp.
Notice of allowance for U.S. Appl. No. 13/780,204 dated Jul. 6, 2015, 12 pp.

* cited by examiner

MAINTAINING HARDWARE RESOURCE BANDWIDTH QUALITY-OF-SERVICE VIA HARDWARE COUNTER

BACKGROUND

A computing device typically runs one instance of an operating system that has access to the hardware resources of the computing device. However, a technique known as virtualization permits a computing device to run a number of instances of operating systems. In virtualization, the computing device instantiates a number of such virtual machines (VMs), and each VM runs its own instance of an operating system.

SUMMARY

A method of an embodiment of the disclosure includes, each time a currently scheduled virtual machine (VM) accesses a hardware resource over a bus for the hardware resource via the currently scheduled VM running on a processor, a hardware component adjusting a bandwidth counter associated with usage of the bus for the hardware resource, without involvement of the currently scheduled VM or a hypervisor managing the currently scheduled VM. The method includes, responsive to the bandwidth counter reaching a threshold value, the hardware component issuing an interrupt by for handling by the hypervisor to maintain bandwidth quality-of-service (QoS) of bus bandwidth related to the hardware resource. The hardware resource and the hardware component are each hardware different than the processor. The bandwidth counter is implemented directly in hardware as opposed to being a software-implemented counter.

A method of another embodiment of the disclosure includes, each time a currently scheduled VM accesses a hardware memory over a bus for the hardware memory via the currently scheduled VM running on a processor, a hardware memory controller decrementing a bandwidth counter associated with usage of the bus for the hardware resource, without involvement of the currently scheduled VM or a hypervisor managing the currently scheduled VM. The method includes, responsive to the bandwidth counter reaching zero, the hardware memory controller issuing an interrupt for handling by the hypervisor to maintain bandwidth QoS of bus bandwidth related to the hardware memory. The bandwidth counter is implemented directly in hardware as opposed to being a software-implemented counter.

BRIEF DESCRIPTION OF THE SEVERAL VIEWS OF THE DRAWINGS

The drawings referenced herein form a part of the specification. Features shown in the drawing illustrate only some embodiments of the disclosure, and not of all embodiments of the disclosure, unless the detailed description explicitly indicates otherwise, and readers of the specification should not make implications to the contrary.

DETAILED DESCRIPTION

Figure 1:
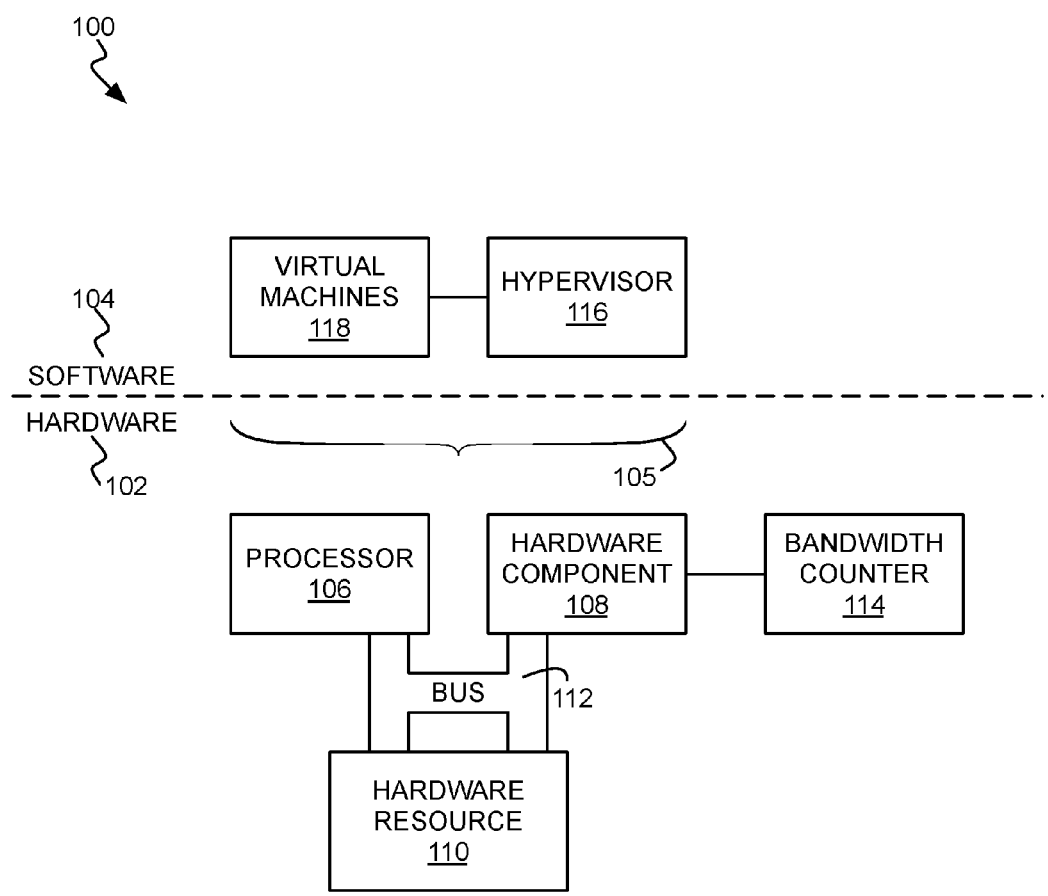
FIG. 1 is a diagram of an example computing system in which hardware resource bandwidth quality-of-service (QoS) is maintained via a hardware counter.

The following detailed description of exemplary embodiments of the disclosure refers to the accompanying drawings that form a part of the description. The drawings illustrate specific exemplary embodiments in which the disclosure may be practiced. The detailed description, including the drawings, describes these embodiments in sufficient detail to enable those skilled in the art to practice the disclosure. Those skilled in the art may further utilize other embodiments of the disclosure, and make logical, mechanical, and other changes without departing from the spirit or scope of the disclosure. Readers of the following detailed description should, therefore, not interpret the description in a limiting sense, and only the appended claims define the scope of the embodiment of the disclosure.

As noted in the background section, virtualization is a technique that permits a computing device to run more than one instance of an operating system on the same computing device as if there were multiple computing devices, which are referred to as virtual machines (VMs). The VMs typically share hardware resources, like memory and processors, of a given computing device. A VM manager (VMM), or hypervisor, manages the VMs, ensuring that they appropriately share the hardware resources of the computing device in accordance with certain reservations, allocations, or priorities, which are referred to generally under the umbrella term or phrase quality-of-service (QoS), assigned to the VMs.

While for a given hardware resource like hardware memory, the total amount of the memory of the computing device that is allocated to a given VM can be reserved, a related metric, bus bandwidth for or related to such memory, cannot as easily be specified. When a VM runs on a processor of a computing device, the VM accesses hardware memory over a bus that may interconnect a memory controller, such as a memory management unit (MMU) to both the hardware memory and the processor. As such, accesses of the memory by the VM, by virtue of it running on the processor in question, uses bandwidth of the bus. Ensuring that each VM is given the appropriate amount of bandwidth, however, is difficult to achieve, particularly without involving the VMs themselves in a cooperative manner, and/or without involving the hypervisor itself. Employing such software-oriented solutions to manage memory bandwidth QoS can result in undesirable performance degradation of the VMs.

Techniques disclosed herein, by comparison, provide for a hardware-centric—and indeed, in at least some implementations, a hardware-only—solution to managing the bus bandwidth related to hardware memory and other hardware resources to maintain such bus bandwidth QoS. A hardware register directly accessible by a particular hardware component like a memory controller, without involving software like a hypervisor or a VM, can be set to a predetermined value associated with the VM that is currently scheduled for running on a processor. When the VM begins, or just prior to beginning, running on the processor, the predetermined value is copied to a bandwidth counter from the hardware register. The bandwidth counter itself may be a different hardware register that is directly accessible by the hardware component in question.

As the VM accesses the hardware memory or other hardware resource in question over a corresponding bus, the hardware component adjusts a bandwidth counter associated with usage of the bus. Such adjustment can be a decrementing, for instance, and does not involve either the currently scheduled VM, the hypervisor managing this VM, or any other VM. The VMs indeed may be unaware and have no knowledge that their bus bandwidth for the hardware resource is being tracked.

If prior to a regular time interval, such as one millisecond, elapsing the bandwidth counter reaches a threshold value, the hardware component issues an interrupt. The threshold value may be zero in the case where the bandwidth counter is decremented. The hypervisor handles this interrupt, which is typically a hardware interrupt, so that QoS of bus bandwidth related to the hardware resource in question is maintained. For instance, the hypervisor may switch the currently scheduled VM for a different VM to run on the processor, even before the regular time interval has elapsed, because the currently scheduled VM has used up its bus bandwidth allocation (corresponding to the predetermined value for the VM that was copied from the hardware register to the bandwidth counter) for the regular time interval.

By comparison, if the regular time interval elapses without the bandwidth counter reaching the threshold value, the hardware component resets the bandwidth counter, by copying the predetermined value for the VM from the hardware register to the bandwidth counter. The hypervisor is not involved in the resetting of the bandwidth counter in this case, and the hardware component does not issue any interrupt. As such, the bus usage for the hardware resource in question is tracked completely in hardware, via a bandwidth counter that is implemented directly in hardware (as opposed to being a software-implemented counter). Therefore, QoS maintenance does not involve the hypervisor unless and until the current VM uses its permitted bandwidth, resulting in the hardware component issuing an interrupt.

This process is repeated, until an interrupt is generated, or until it is time for the current VM to be switched for a new VM to run on the processor as part of the regular schedule for the processor. In the latter case, the hypervisor copies a predetermined value corresponding to the new VM's bus bandwidth allocation to the hardware register, and the process described above is started again for the new VM to run on the processor, by copying the predetermined value from the hardware register to the bandwidth counter, adjusting the counter each time the hardware resource is accessed over the bus, and so on. Each VM can have a different predetermined value corresponding to its bus bandwidth allocation for the hardware resource.

The hypervisor is thus involved just—and in at least some implementations, only—at two times: when the hardware component issues an interrupt, and when the VM currently running on the processor is to be switched for a different processor. Therefore, the techniques described herein do not require much if any overhead on the part of the hypervisor, since the hypervisor does not itself keep track of bandwidth usage of the hardware resource by the VMs while such bandwidth is being used; rather, the hardware component does. Furthermore, as noted above, the VMs do not have to be and indeed in at least some implementations are not aware that their bandwidth usage is being tracked.

FIG. 1 shows an example computing system 100, which may be implemented on a single computing device, such as a single computer, or over multiple computing devices, such as multiple computers. The computing system 100 includes hardware 102 and software 104. The software 104 is implemented by the hardware 102, as indicated by brace 105, insofar as the hardware 102 executes the software 104.

The hardware 102 of the computing system 100 includes at least a processor 106, a hardware component 108, and a hardware resource 110. The processor 106, the hardware component 108, and the hardware resource 110 are physically connected to one another over a hardware bus 112 that is related to and/or is for the hardware resource 110. For example, the hardware component 108 may be an MMU or other memory controller when the hardware resource 110 is hardware memory, such that the bus 112 is a hardware memory bus. The hardware 102 can and typically does include other hardware, in addition to the processor 106, the hardware component 108, the hardware resource 110, and the bus 112 that are depicted in FIG. 1. As just one example, there can be processors in addition to the processor 106.

In the in the example of FIG. 1, the processor 106 accesses the hardware resource 110 over the hardware bus 112 directly. Where the hardware resource 110 is hardware memory, such an implementation may be referred to as a direct memory access (DMA) approach by which the processor 106 accesses the hardware memory. In other implementations, however, access of the hardware resource 110 by the processor 106 may occur through the hardware component 108 itself. It is noted that the terminology processor 106 as used herein can encompass a single core of a multiple-core processor, where this core is a virtual or actual physical processor core. For instance, some processors have two or more physical cores, and each physical core can be divided into two or more virtual cores. The terminology processor thus encompasses each such physical core and/or each such virtual core of a multiple-core processor.

The hardware 102 of the computing system 100 also includes a bandwidth counter 114 that the hardware component 108 adjusts to track usage of the bus 112 when the processor 106 accesses the hardware resource 110. For instance, the hardware component 108 may decrement the bandwidth counter 114 each time the processor 106 accesses the hardware resource 110. The bandwidth counter 114 may be a hardware register, and is directly accessible by the hardware component 108 without the assistance or involvement of any of the software 104 of the computing system 100. The bandwidth counter 114 may be a part of the hardware component 108 itself, or of the processor 106 or of the hardware resource 110 itself, such as a hardware register thereof, although the counter 114 is called out separately in FIG. 1 for illustrative clarity.

The software 104 of the computing system 100 includes a hypervisor 116 and a number of VMs 118, such as at least one VM 118. The hypervisor 116 manages instantiation and deletion of the VMs 118, and further manages scheduling of the VMs 118 for running on the processor 106. The hypervisor 116 is also referred to as a VMM. Each virtual machine 118 is a software implementation of an actual physical machine—i.e., a computer or computing device—that executes software as if it were a separate physical machine. Each VM 118 typically includes its own operating system, which is referred to as a guest operating system, and which governs just the VM 118, and not other VMs 118 that may be running on the same host computing system 100 in question.

Figure 2:
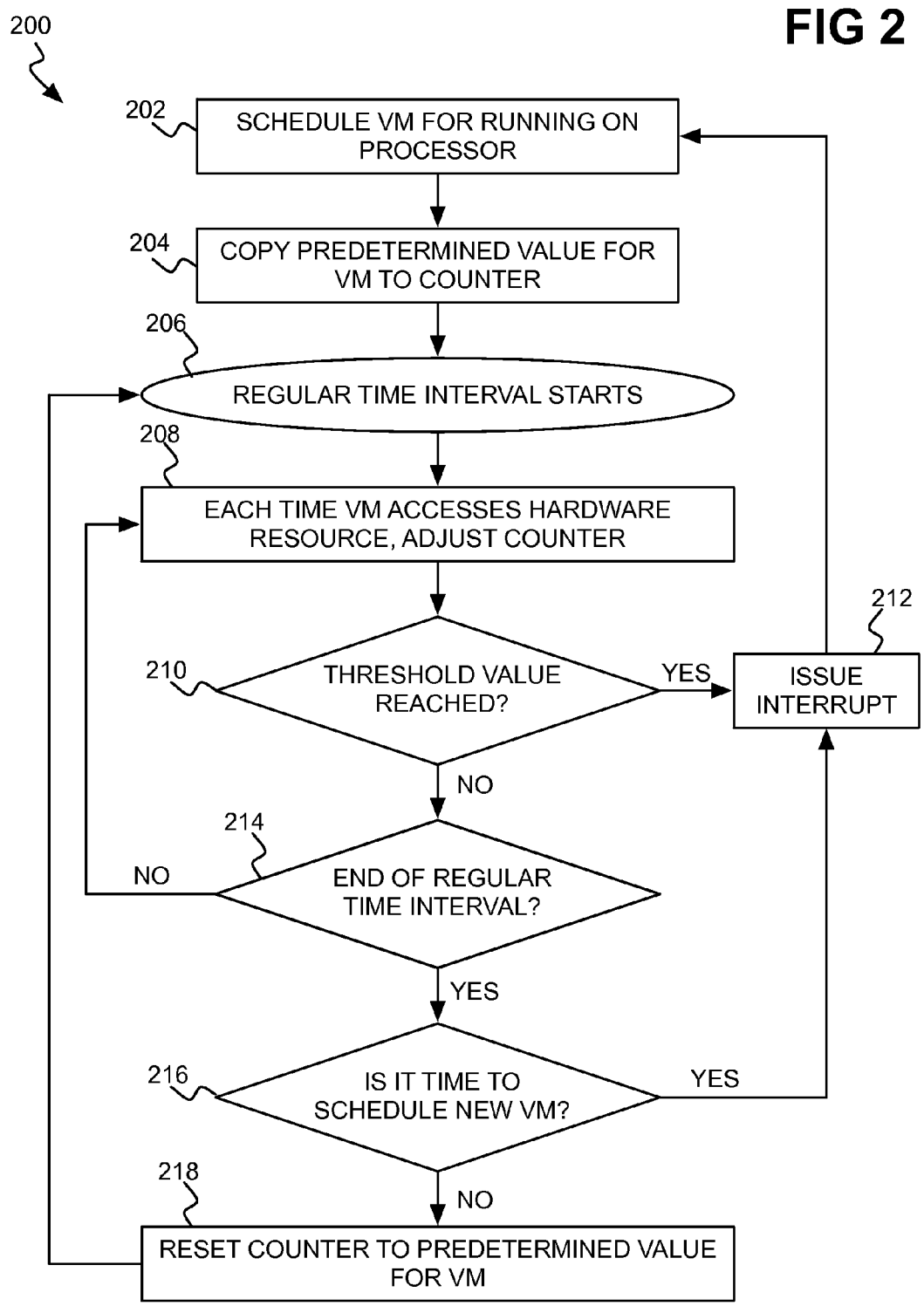
FIG. 2 is a flowchart of an example method for maintaining hardware resource bandwidth QoS via a hardware counter in the computing system of FIG. 1.

FIG. 2 shows an example method 200 by which bus bandwidth of the hardware resource 110 is managed for QoS purposes in a hardware-centric manner within the computing system 100. The method 200 can operate within a scheduling methodology in which the hypervisor 116 schedules different VMs 118 to run on the processor 106 at different times. In particular, there can be regular time intervals, such as one millisecond each. The hypervisor 116 may schedule a first VM 118 to run on the processor 106 for X time intervals, followed by a second VM 118 to run on the processor 106 for Y time intervals, and so on, where X may be equal to or different than Y. However, if the first VM 118 uses its allocated bus bandwidth for the hardware resource 110 within a given time interval, the hypervisor 116 may switch out the first VM 118 for the second VM 118 to run on the processor 106 earlier, before the processor 106 has used its X time intervals of processor time.

The hypervisor 116 thus schedules a VM 118 to run on the processor 106 (202). This VM 118 is referred to as the currently scheduled VM 118. A predetermined value for the currently scheduled VM 118 is copied to the bandwidth counter 114 (204). The predetermined value is associated with the currently scheduled VM 118, and corresponds to the amount of bandwidth of the bus 112 the VM 118 is permitted to use during each regular time interval while the VM 118 runs on the processor 106 when accessing the hardware resource 110. That is, the predetermined value corresponds to the bus bandwidth QoS of the currently scheduled VM 118 for the hardware resource 110, during each regular time interval. A regular time interval thus starts (206).

Each time the currently scheduled VM 118, as running on the processor 106, accesses the hardware resource 110 over the bus 112, the hardware component 108 correspondingly adjusts the bandwidth counter 114 (208). If the bandwidth counter 114 reaches a threshold value as a result of such adjustment (210), then the hardware component 108 issues an interrupt, such as a hardware interrupt (212). The interrupt signals to the hypervisor 116 that the currently scheduled VM 118 is to be switched out on the processor 106 for a different, new VM 118 (i.e., a newly scheduled VM 118), such that the method 200 is repeated at part 202.

If, however, the bandwidth counter 114 has not reached the threshold value (210), and if the current regular time interval has not yet elapsed or expired (214), then the method 200 proceeds back to part 208. If the bandwidth counter 114 does not reach the threshold value during the current regular time interval, then the method 200 proceeds from part 210 to part 214, and then to part 216. If it is not yet time to schedule a new VM 118 (i.e., a newly scheduled VM 118) for running on the processor 106, then the hardware component 108 resets the bandwidth counter 114 to the predetermined value for the currently scheduled VM 118 (218), and the method 200 proceeds back to part 206 with a new regular time interval starting.

As such, if the currently scheduled VM 118 does not ever exceed its QoS for bus bandwidth related to the hardware resource 110—such that the bandwidth counter 114 never reaches the threshold value during any time interval when this VM 118 is running on the processor 106—at some point it will be time to schedule a new VM 118 on the processor 106 for running on the processor 106. At this point in time, the method 200 proceeds from part 216 to part 212, at which the hardware component 108 may issue a hardware interrupt also signaling to the hypervisor 116 that it is time to switch out the VM 118 that is running on the processor 106. For instance, in the example noted above where a first VM 118 is scheduled to run on the processor 106 for X regular time intervals, once X such intervals have elapsed without the first VM 118 using up its bus bandwidth QoS during any given interval, then the first VM 118 is switched out on the processor 106 for the second VM 118.

It is noted, therefore, that except when the hypervisor 116 has to schedule a VM 118 for running on the processor 106, no software is involved while tracking bus bandwidth usage for the currently running VM 118 on the processor 106 while this VM 118 is accessing the hardware resource 110 over the bus 112. Neither the hypervisor 116 nor any of the VMs 118 is involved, in particular. Just hardware is involved in tracking such bandwidth usage, particularly the hardware component 108 adjusting the bandwidth counter 114, which is implemented directly in hardware and that the component 108 can directly access. When a regular time interval ends and it is not yet time for a new VM 118 to be scheduled to run on the processor 106, the hardware component 108 without involvement of any software resets the bandwidth counter 114 in part 218.

As such, in at least some implementations, the hypervisor 116 is involved only responsive to an interrupt being issued by the hardware component 108, and more generally when, as noted above, a new VM 118 is to be scheduled for running on the processor 106. From part 210, the hardware component 108 issues an interrupt in part 212 to signal to the hypervisor 116 that the currently running VM 118 has exceeded its per-regular time interval bandwidth QoS for the hardware resource 110. From part 216, the hardware component 108 may issue an interrupt to signal to the hypervisor 116 (or the hypervisor 116 may otherwise become aware of) that the currently scheduled VM 118 has non-prematurely ended its prescheduled number of regular time intervals on the processor 106 (as opposed to premature such ending when the threshold value is reached in part 210).

Furthermore, as noted above, different VMs 118 can have different bus bandwidth QoS, such that different VMs 118 can have different predetermined values that are copied to the bandwidth counter 114 in part 204 and to which the bandwidth counter 114 is reset in part 218. For example, within a computing-as-a-service scenario, customers or clients may not manage their own computing systems but rather pay a service provider to provide this service as one or more VMs 118 for the same or different customers. A given customer may pay more for higher bandwidth QoS related to the hardware resource 110 in question, such that this customer's VM 118 or VMs 118 are provided with a higher predetermined value for the bandwidth counter 114.

The various parts of the method 200 are depicted in a particular order for illustrative clarity. However, in actuality, at least some parts of the method 200 can be more event driven than that which may be inferred from the ordering shown in FIG. 2. For example, the event of the processor 106 on which the currently scheduled VM 118 is running accessing the hardware resource 110 over the bus 112 may trigger part 208 to be performed. The event of the bandwidth counter 114 reaching the threshold value may trigger part 212 to be performed. The event of a regular time interval expiring may trigger part 218 to be performed. The event of it being time to schedule a new VM 118 for running on the processor 106 may trigger part 212 to be performed.

Figure 3:
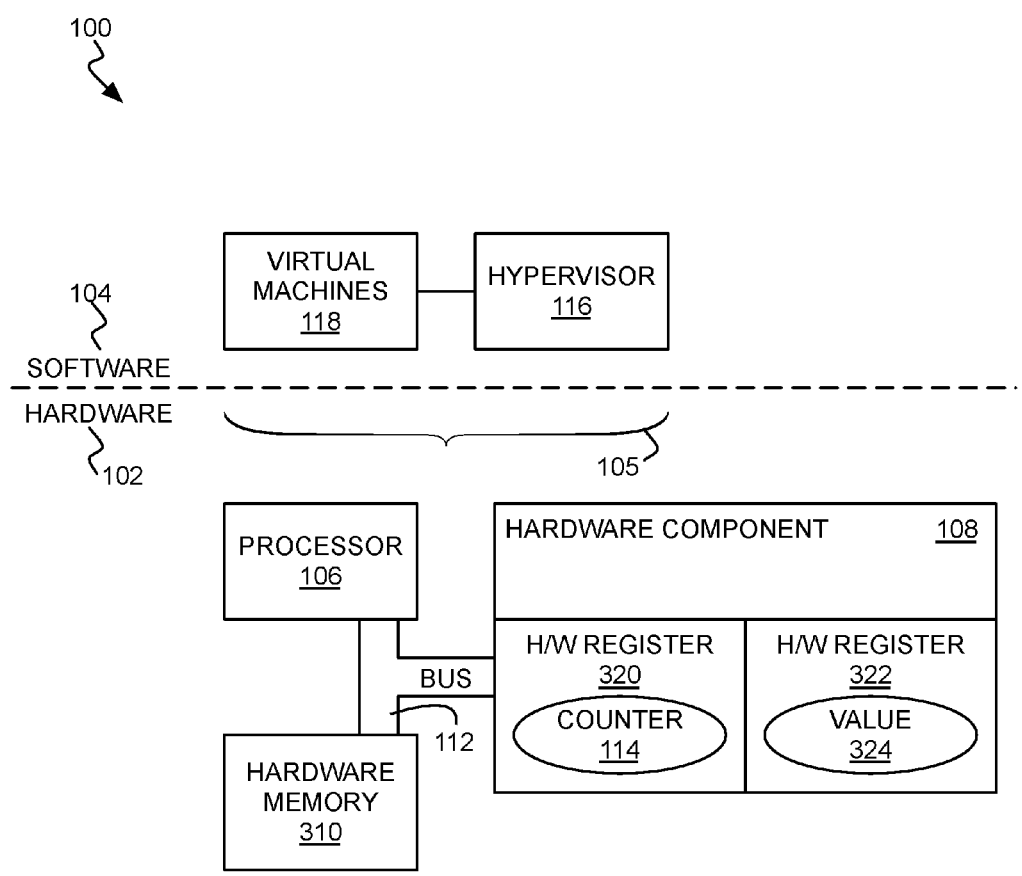
FIG. 3 is a diagram of another example computing system in which hardware resource bandwidth QoS is maintained via a hardware counter, and which is consistent with but more particular than the computing system of FIG. 1.

FIG. 3 shows another example of the computing system 100 that is more specific than but consistent with the example thereof that FIG. 1 depicts. In FIG. 3, the hardware 102, the software 104, the processor 106, the hardware component 108, the bus 112, the hypervisor 116, and the VMs 118 are depicted as in FIG. 1. However, the hardware resource 110 is more specifically shown in FIG. 3 as hardware memory 310, which is one particular type of hardware resource 110. Furthermore, the hardware component 108 is depicted as including two hardware registers 320 and 322 that store the bandwidth counter 114 and a predetermined value 324, respectively. Stated another way, the bandwidth counter 114 is implemented as the hardware register 320.

It is noted that other implementations of the computing system 100 can include some but not all aspects of FIG. 3 in particularizing FIG. 1. For instance, the hardware memory 310 may be replaced by another type of hardware resource 110, but the hardware registers 320 and 322 implemented as depicted in FIG. 3, or vice-versa. Furthermore, the hardware registers 320 and 322 can be a part of hardware other than the hardware component 108, such as the hardware memory 310 itself, the processor 106, another hardware resource 110, or other type of hardware.

In FIG. 3, the hardware register 320 thus stores the bandwidth counter 114 that has been described in relation to FIGS. 1 and 2 above. The hardware register 322 stores the predetermined value 324, which is the predetermined value 324 to which the bandwidth counter 114 is set when a new VM 118 is being scheduled for running on the processor 106, and to which the counter 114 is reset at the end of a regular time interval when the predetermined threshold has not been reached. The hypervisor 116 may set the predetermined value 324 within the hardware register 322 when scheduling a new VM 118 for running on the processor 106, which the hardware component 108 may then copy to the bandwidth counter 114 within the hardware register 320. By comparison, the hardware component 108 resets the bandwidth counter 114 within the hardware register 320 to the predetermined value 324 within the hardware register 322 at the end of a regular time interval when the predetermined threshold has not been reached.

Figure 4:
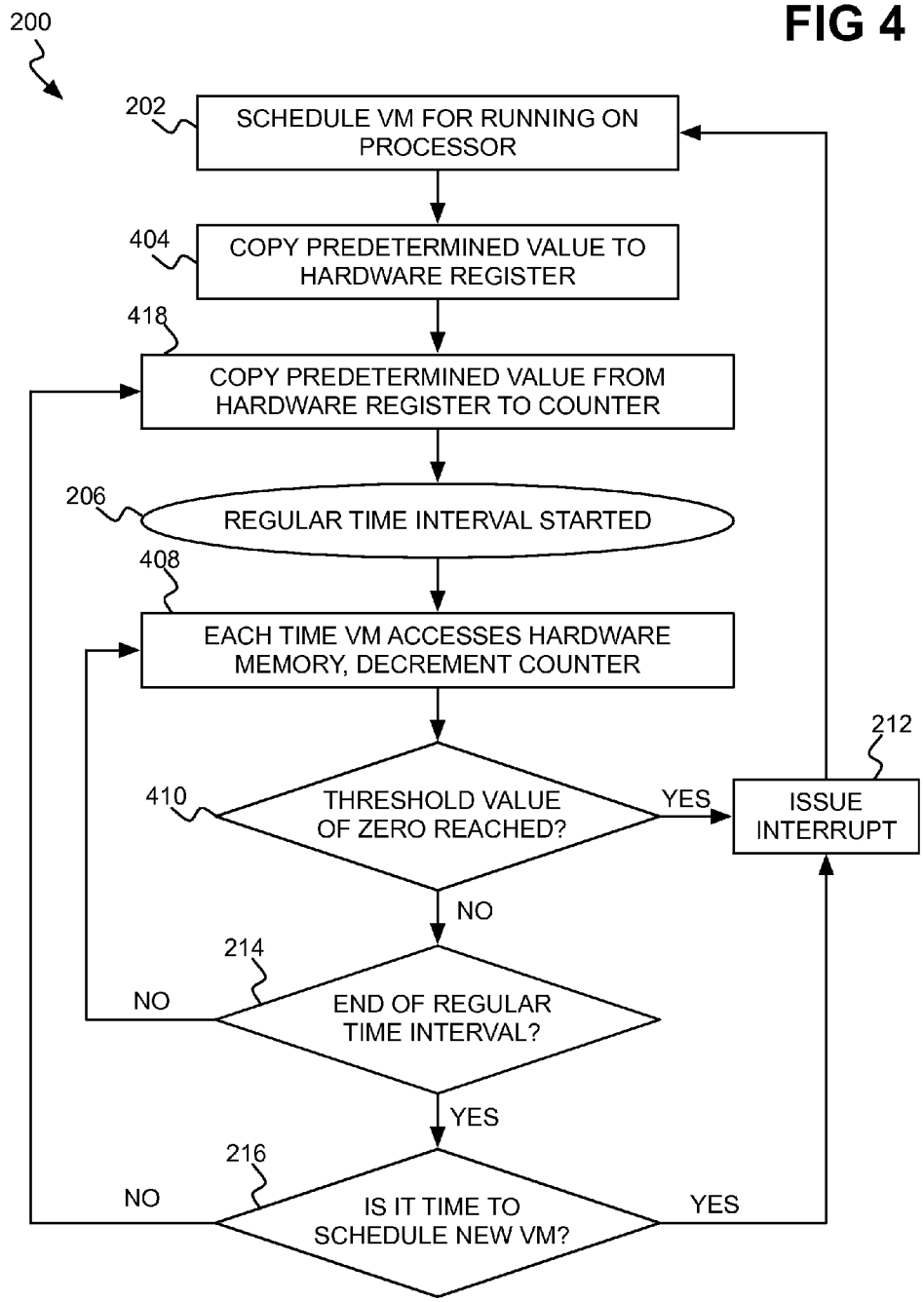
FIG. 4 is a flowchart of an example method for maintaining hardware resource bandwidth QoS via a hardware counter in the computing system of FIG. 3, and which is consistent with but more particular than the method of FIG. 2.

FIG. 4 shows the example method 200 by which bus bandwidth of the hardware memory 310 is managed for QoS purposes in a hardware-centric manner within the computing system 100 of the example of FIG. 3. In FIG. 4, parts 202, 206, 212, 214, and 216 are depicted as in FIG. 2. However, part 204 of FIG. 2 has been replaced by part 404 in FIG. 4, and part 418 of FIG. 4 may also be considered as being performed within part 204 within FIG. 2. Part 208 of FIG. 2 has been replaced by part 408, and part 210 has been replaced by part 410 in FIG. 4. Furthermore, part 418 of FIG. 4 may be considered as being performed in lieu of or for part 218 in FIG. 2. Part 418 of FIG. 4 can thus be considered as being performed within each of parts 204 and 216 of FIG. 2.

The hypervisor 116 schedules a VM 118 for running on the processor 106 (202). The hypervisor 116 further copies the predetermined value corresponding to the bus bandwidth QoS of this currently scheduled VM 118 for the hardware memory 310 to the hardware register 322, as the predetermined value 324 (404). Prior to or when a regular time interval starts, the hardware component 108, which may be a memory controller like an MMU, copies the predetermined value 324 from the hardware register 322 to the hardware register 320, as the bandwidth counter 114 (418). A regular time interval thus starts (206).

Each time the currently scheduled VM 118, as running on the processor 106, accesses the hardware memory 310 over the bus 112, the hardware component 108 correspondingly decrements the bandwidth counter 114 of the hardware register 320 (408). If the bandwidth counter 114 reaches a threshold value of zero as a result of such decrementation (410), then the hardware component 108 issues an interrupt (212). This interrupt signals to the hypervisor 116 that the currently scheduled VM 118 is to be switched out on the processor 106 for a different, new VM 118 (i.e., a newly scheduled VM 118), such that the method 200 is repeated at part 202.

If, however, the bandwidth counter 114 of the hardware register 320 has not yet reached zero (410), and if the current regular time interval has not yet elapsed or expired (214), then the method 200 proceeds back to part 214. If the bandwidth counter 114 of the hardware register 320 does not reach zero during the current regular time interval, then the method 200 proceeds from part 410 to part 214, and then to part 216. If it is not yet time to schedule a new VM 118 (i.e., a newly scheduled VM 118) to run on the processor 106, then the hardware component 108 resets the bandwidth counter 114 of the hardware register 320 to the predetermined value 324 for the currently scheduled VM 118. That is, the method 200 proceeds back to part 418, at which the hardware component 108 again copies the predetermined value 324 from the hardware register 322 to the hardware register 320 to reset the bandwidth counter 114. The method 200 then continues with a new regular time interval starting at part 206.

FIG. 4 thus particularizes FIG. 2 in at least the following ways. First, the method 200 as described in relation to FIG. 4 refers to the computing system 100 in the example of FIG. 3 as opposed to in the example of FIG. 1 as is the case with the method 200 as described in relation to FIG. 2. Second, the method 200 as described in relation to FIG. 4 provides for copying the predetermined value for a VM 118 in part 204 of FIG. 2 via copying the predetermined value 324 to the hardware register 322 in part 404 and then copying this predetermined value 324 from the hardware register 322 to the hardware register 320 as the bandwidth counter 114 in part 418. Similarly, third, the method 200 as described in relation to FIG. 4 provides for resetting the bandwidth counter 114 in part 218 of FIG. 2 also via copying the predetermined value 324 from the hardware register 322 to the hardware register 320 as the bandwidth counter 114 in part 418. As with the particularizing of FIG. 1 via FIG. 3, the particularizing of FIG. 2 via FIG. 4 can include some but not all aspects of FIG. 4, however.

It is noted that, as can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A method comprising:
   when a first virtual machine (VM) and not a second VM runs on a shared processor during the first VM's scheduled regular time interval, resetting by a hardware component a bandwidth counter to a first value associated with the first VM, and then decrementing the bandwidth counter, without involvement of any VM or a hypervisor, each time the first VM accesses a hardware resource;
   when the second VM and not the first VM runs on the shared processor during the second VM's scheduled regular time interval, resetting by the hardware component the bandwidth counter to a second value associated with the second VM, and then decrementing the bandwidth counter, without involvement of any VM or the hypervisor, each time the second VM accesses the hardware resource; and
   responsive to the bandwidth counter reaching a threshold value when the first or second VM running on the shared processor at the first or second VM's respective scheduled regular time interval, issuing an interrupt by the hardware component for handling by the hypervisor to maintain bandwidth quality-of-service (QoS) related to the hardware resource, wherein the hardware resource and the hardware component are each hardware different than the shared processor, wherein the bandwidth counter is implemented directly in hardware as opposed to being a software-implemented counter.

2. The method of claim 1, further comprising:
upon expiration of a regular time interval prior to the bandwidth counter reaching the threshold value, resetting the bandwidth counter to the first or second value associated with the first or second VM that is currently scheduled to run on the shared processor, by the hardware component without involvement of any VM or the hypervisor,
such that no interrupt is issued by the hardware component and the hypervisor is not involved with resetting the bandwidth counter.

3. The method of claim 2, wherein resetting the bandwidth counter to the predetermined value by the hardware component comprises:
copying the predetermined value from a hardware register directly accessible by the hardware component, by the hardware component without involvement of any VM or the hypervisor.

4. The method of claim 1, further comprising:
upon a currently scheduled VM having to be switched for a newly scheduled VM to now be run on the shared processor instead of the currently scheduled VM, resetting the bandwidth counter to a predetermined value associated with the newly scheduled VM, by the hypervisor.

5. The method of claim 4, further comprising:
upon the currently scheduled VM having to be switched for the newly scheduled VM, copying the predetermined value to a hardware register implemented directly in hardware as opposed to being a software-implemented register, by the hypervisor, the hardware register directly accessible by the hardware component.

6. The method of claim 1, further comprising:
prior to decrementing the bandwidth counter each time the first or second VM that is currently scheduled to run on the shared processor accesses the hardware resource, resetting the bandwidth counter to the first or second value associated with the respective first or second VM that is currently scheduled to run on the shared processor.

7. The method of claim 6, further comprising:
prior to decrementing the bandwidth counter each time the first or second VM accesses the hardware resource, copying the first or second value to a hardware register implemented directly in hardware as opposed to being a software-implemented register, by the hypervisor, the hardware register directly accessible by the hardware component.

8. The method of claim 1, wherein the bandwidth counter is a hardware register directly accessible by the hardware component.

9. The method of claim 1, wherein the hardware resource is hardware memory, and the hardware component is a hardware memory controller.

10. A system comprising:
a shared processor;
a plurality of virtual machines (VMs), including a first VM and a second VM, to run on the shared processor;
a hypervisor to manage the VMs and to schedule the VMs to run on the shared processor;
a hardware resource;
a bus connecting the shared processor to the hardware resource;
a bandwidth counter associated with usage of the bus for the hardware resource to track the usage of the bus for the hardware resource by each VM on a per-VM basis and implemented directly in hardware as opposed to being a software-implemented counter; and
a hardware component to:
when the first VM and not a second VM runs on the shared processor during the first VM's scheduled regular time interval, reset the bandwidth counter to a first value associated with the first VM, and then decrement the bandwidth counter, without involvement of any VM or the hypervisor, each time the first VM accesses a hardware resource;
when the second VM and not the first VM runs on the shared processor during the second VM's scheduled regular time interval, reset by the hardware component the bandwidth counter to a second value associated with the second VM, and then decrement the bandwidth counter, without involvement of any VM or the hypervisor, each time the second VM accesses the hardware resource; and
responsive to the bandwidth counter reaching a threshold value when the first or second VM running on the shared processor at the first or second VM's respective scheduled regular time interval, issue an interrupt by the hardware component for handling by the hypervisor to maintain bandwidth quality-of-service (QoS) related to the hardware resource,
wherein the hardware resource and the hardware component are each hardware different than the processor.

11. The system of claim 10, wherein upon expiration of a regular time interval associated with the first or second VM that is currently scheduled to run on the shared processor, prior to the bandwidth counter reaching the threshold value, no interrupt is issued by the hardware component and the hypervisor is not involved with resetting the bandwidth counter.

12. The system of claim 11, further comprising one or more hardware registers directly accessible by the hardware component, the hardware register to store the first and the second values, and the hardware component to reset the bandwidth counter by copying the first and the second values from the hardware register.

13. The system of claim 10, wherein the bandwidth counter is a hardware register directly accessible by the hardware component,
and wherein the hardware resource is hardware memory, and the hardware component is a hardware memory controller.

14. A non-transitory computer-readable data storage medium storing code executable by a hardware component to perform a method comprising:
when a first virtual machine (VM) and not a second VM runs on a shared processor during the first VM's scheduled regular time interval, resetting a bandwidth counter to a first value associated with the first VM, and then decrementing the bandwidth counter, without involvement of any VM or a hypervisor, each time the first VM accesses a hardware resource;
when the second VM and not the first VM runs on the shared processor during the second VM's scheduled regular time interval, resetting the bandwidth counter to a second value associated with the second VM, and then decrementing the bandwidth counter, without involvement of any VM or the hypervisor, each time the second VM accesses the hardware resource; and responsive to the bandwidth counter reaching a threshold value when the first or second VM running on the shared processor at the first or second VM's respective scheduled regular time interval, issuing an interrupt for handling by the hypervisor to maintain bandwidth quality-of-service (QoS) related to the hardware resource, wherein the hardware resource and the hardware component are each hardware different than the shared processor, wherein the bandwidth counter is implemented directly in hardware as opposed to being a software-implemented counter.

15. The non-transitory computer-readable data storage medium of claim 14, wherein upon expiration of a regular time interval associated with the first or second VM that is currently scheduled to run on the shared processor, prior to the bandwidth counter reaching the threshold value, no interrupt is issued by the hardware component.

\* \* \* \* \*